UNITED STATES PATENT OFFICE 2,516,983

MICACEOUS COMPOSITIONS

Robert A. Hatch, Corning, N. Y., assignor to Corning Glass Works, Corning, N. Y., a corporation of New York No Drawing. Application September 15, 1947, Serial No. 774,181

3 Claims. (Cl. 106—39)

This invention relates to electrical insulating materials and particularly to synthetic micaceous compositions which can be fused and crystallized by slow cooling to yield large lamellar crystals or other useful commercial products.

The naturally occurring mica known as phlogopite, $K_2Mg_6Al_2Si_6O_{20}(OH)_4$, cannot be synthesized because its hydroxyl content cannot be retained but is eliminated during melting. By substituting the hydroxyl with fluorine, a composition known as fluor-phlogopite, $K_2Mg_6Al_2Si_6O_{20}F_4$, has been produced which can be prepared synthetically. Synthetic micaceous compositions, as is well known, can be melted and crystallized by cooling under rigidly controlled conditions for the purpose of causing the formation of large, single lamellar crystals.

The general procedure for fusing and crystallizing such synthetic micaceous compositions, as described in detail in Fiat Final Reports #746, #747 and #748 (1946) of the United States Office of Military Government for Germany, is as follows:

A crucible is filled to the brim with tablets of compressed batch after first placing a piece of sintered alumina on the bottom of the crucible to serve as a starting point for crystallization. A cover with a charging hole in the center is placed on the crucible and the temperature of the assembly is raised slowly to about 900° C. in a preheating furnace. The time required for this preheating operation depends in part on the size of the melt and is about 14 hours for a 10 kg. melt. The crucible is then transferred to a melting and crystallizing furnace already at a temperature of 900° C. and heating is continued at a controlled rate up to a maximum of 1450° C. This usually takes about an additional 24 hours. The melt is kept at that temperature for six hours longer, and further charge tablets are then added at 2-hour intervals until the melt fills the whole crucible. When the melt is finally reduced to a thin liquid, it is thoroughly agitated with a preheated stirrer of sintered alumina or other material which will resist corrosion. The temperature is then kept constant for some time for final clarification of the liquid before starting it on the cooling schedule.

The rate of cooling of the melt must be uniform, slow, and without regressive fluctuation over that portion of the temperature range in which crystallization of fluor-phlogopite occurs, namely, about 1350° C. to 1310° C. Slow cooling favors the formation of fewer crystal nuclei with resulting larger individual crystals. It also favors the development of structurally more perfect crystals. Temperature fluctuation and non-uniformity in the cooling rate, on the other hand, have just the opposite effect, tending to increase the number of nuclei and impair perfection of the crystals. The cooling rate may be rapid from 1450° C., the temperature at which the batch is melted, down to the liquidus temperature and again at all temperatures below the solidus temperature.

The cooling rate throughout the crystallization temperature range must not exceed about 6° C. per hour for a 10 kg. melt and about 1° C. per hour for a 100 kg. melt. The total elapsed time required to obtain a crucible of synthetic micaceous crystals is about three days for the 10 kg. melt and about nine days for the 100 kg. melt, but inasmuch as the larger melt produces ten times as much and an even higher percentage of large sheets, the capacity of the larger unit is more than three times that of the smaller.

Closely associated with the factor of cooling rate is that of the thermal gradient over the melt. Even though the cooling rate is slow, if every part of the melt reaches the liquidus temperature at the same instant, many crystal nuclei will form throughout the melt. This difficulty is overcome by creating a thermal gradient over the melt so that one part of it will reach the liquidus temperature before the other parts. A crystal forming in the cooler portion will then tend to grow toward the hotter zones of the melt as the temperature of the whole is gradually reduced.

By adjusting the gradient so that the bottom of the melt is cooler than the upper portions, it is possible to cause the micaceous sheets to be oriented vertically and to grow up through the melt. This does away with the tendency to form voids or trap gas in the crystals. Gradients of 3° to 4° C. per cm. develop a central vertical crystal growing up through the melt. The thermal gradient must correspond to the velocity of crystal growth in order to obtain crystals as large as possible and to assure that they will be oriented vertically. The rate of growth of synthetic micaceous crystals has been observed to be about 2 mm. per minute.

Complete elimination of vibration is necessary while the melt is crystallizing. Vibration seems to promote the formation of individual crystal nuclei, thus inducing the melt to crystallize as an aggregate of smaller crystals than otherwise would be obtained. In the growth of a single crystal there is an electromagnetic field around it which causes nearby unattached ionic groups or molecules to become oriented similarly to the parent crystal before they are attached. Vibration either tends to destroy the orienting effect of this field or causes the unattached molecules to oscillate, thus interfering with their response to the orienting force. Vibration may also create currents in the melt, thus tending to upset a favorable thermal gradient.

One of the many difficulties encountered in the crystallization of fluor-phlogopite is the interference of forsterite or magnesium orthosilicate, $Mg_2SiO_4$, which crystallizes therefrom as the primary phase. The premature separation of forsterite seeds the melt with a multiplicity of small crystals and makes it practically impossible to obtain one or a few large mica crystals.

The primary object of this invention is to provide new synthetic micaceous compositions.

Another object is to provide synthetic micaceous compositions having better properties than prior synthetic micaceous compositions.

Another object is to provide synthetic micaceous compositions in which mica is the primary phase.

Another object is to prevent the crystallization of forsterite as a primary phase in the crystallization of fluor-phlogopite.

Another object is to provide a micaceous composition which has a lower liquidus than fluor-phlogopite.

To these and other ends this invention comprises the novel compositions to be more fully described in the following specification and claimed in the appended claims.

A known composition, $K_2Mg_4Li_2Si_8O_{20}F_4$ (see U. S. Geological Survey Bulletin 950, page 106), is herein referred to as "taeniolite," which is a rare natural mica having a supposedly similar composition. I have found that this composition may be prepared by fusion and crystallization and that it forms a mica as a primary phase. The crystals, however, are too brittle for commercial use.

I have now discovered new micaceous compositions which are equivalent in composition to mixtures or, to be more exact, to solid solutions of fluor-phlogopite and taeniolite and which, when prepared synthetically, form new and useful commercial products. Although the new products may include compositions equivalent to all proportions of fluor-phlogopite and taeniolite, they preferably range from the equivalent of 50 mol per cent fluor-phlogopite and 50 mol per cent taeniolite, to 95 mol per cent of fluor-phlogopite and 5 mol per cent of taeniolite. The preferred range of compositions may be expressed by the formula:

I $$K_2Mg_{4+2x}Li_{2-2x}Al_{2x}Si_{8-2x}O_{20}F_4$$

where $x$ is the mol fraction of fluor-phlogopite. When the value of $x$ is 0.5, the formula becomes:

II $$K_2Mg_5LiAlSi_7O_{20}F_4$$

and when the value of $x$ is 0.95, the formula becomes:

III $$K_2Mg_{5.9}Li_{0.1}Al_{1.9}Si_{6.1}O_{20}F_4$$

The following batches in parts by weight, which I have melted and crystallized by the method described above, are examples of compositions falling within the above recited range, it being understood that the invention is not limited to the examples but includes all other proportions indicated by Formula I.

Table I

|  | 1 | 2 | 3 | 4 |
|---|---|---|---|---|
| $K_2SiF_6$ | 13.0 | 15.07 | 15.9 | 16.7 |
| $K_2CO_3$ | 8.1 | 6.75 | 6.2 | 5.65 |
| LiF | 3.1 | 1.52 | .9 | .3 |
| MgO | 23.8 | 26.0 | 26.9 | 27.8 |
| $Al_2O_3$ | 6.0 | 8.97 | 10.1 | 11.3 |
| $SiO_2$ | 46.0 | 41.69 | 39.9 | 38.2 |

In the above batches any other equivalent materials, which in proper proportions will yield the same products, may be used in lieu of those shown. In order to prevent or diminish the loss of fluorine during melting, all materials should be anhydrous and free from compounds or radicals which form water on decomposition. It also is advantageous to allow a sufficient excess of fluorine in the batch to compensate for any unavoidable loss during melting. For optimum production of large lamellar crystals which are uncontaminated with other crystals or glassy matrix, it is essential that the composition to be melted corresponds closely to a mixture of fluor-phlogopite and taeniolite. In other words, the batch materials should be substantially free from impurities and the various components of the composition should be in the stoichiometric proportions of Formula I.

On the oxide basis, as it is customary to consider siliceous products when analyzed, the above batches yield the following theoretical compositions in per cent by weight respectively when melted and crystallized:

Table II

|  | 1 | 2 | 3 | 4 |
|---|---|---|---|---|
|  | Per cent | Per cent | Per cent | Per cent |
| $SiO_2$ | 51.0 | 46.8 | 45.3 | 43.6 |
| $K_2O$ | 11.4 | 11.3 | 11.2 | 11.2 |
| $Li_2O$ | 1.8 | .9 | .5 | .2 |
| $Al_2O_3$ | 6.2 | 9.2 | 10.3 | 11.5 |
| MgO | 24.4 | 26.6 | 27.5 | 28.3 |
| F | 9.0 | 9.0 | 9.0 | 9.0 |
| Total | 103.8 | 103.8 | 103.8 | 103.8 |
| O≎F | 3.8 | 3.8 | 3.8 | 3.8 |
|  | 100.0 | 100.0 | 100.0 | 100.0 |

In the above compositions, as in all siliceous compositions containing fluorine, it is not known with what cation or cations the fluorine is combined. In accordance with analytical practice, the fluorine is here computed as F and the total percentage of the various constituents is greater than 100. In order to arrive at a total of 100% it is customary to deduct the oxygen equivalent of fluorine, known to analysts as the percentage of fluorine divided by the combining weight of fluorine, 19, and multiplied by the combining weight of oxygen, 8, or in brief, the percentage of fluorine multiplied by the factor 0.421.

Composition 1 corresponds to the formula $$K_2Mg_5LiAlSi_7O_{20}F_4$$

Composition 2 corresponds to the formula $$K_2Mg_{5.5}Li_{0.5}Al_{1.5}Si_{6.5}O_{20}F_4$$

Composition 3 corresponds to the formula $$K_2Mg_{5.7}Li_{0.3}Al_{1.7}Si_{6.3}O_{20}F_4$$

Composition 4 corresponds to the formula $$K_2Mg_{5.9}Li_{0.1}Al_{1.9}Si_{6.1}O_{20}F_4$$

The above compositions crystallize with the lamellar configuration which is characteristic of mica in general. The melting points of the various compositions are substantially below the melting point of fluor-phlogopite. X-ray analyses of compositions 2, 3, and 4 show definite indications of solid solution. The compositions herein disclosed may be melted and cooled under controlled conditions in known manner for the production of large lamellar crystals.

I claim:

1. A synthetic micaceous product consisting of a solid solution of fluor-phlogopite and taeniolite as expressed by the formula $$K_2Mg_{4+2x}Li_{2-2x}Al_{2x}Si_{8-2x}O_{20}F_4$$

where $x$ is the mol fraction of fluor-phlogopite.

2. A synthetic micaceous product consisting of a solid solution of fluor-phlogopite and taeniolite as expressed by the formula $$K_2Mg_{4+2x}Li_{2-2x}Al_{2x}Si_{8-2x}O_{20}F_4$$

where $x$ is the mol fraction of fluor-phlogopite and has a value of between 0.5 and 0.95.

3. A synthetic micaceous product having a molecular composition which ranges from the composition expressed by the formula $$K_2Li_{0.1}Mg_{5.9}Al_{1.9}Si_{6.1}O_{20}F_4$$

to that expressed by the formula $$K_2LiMg_5AlSi_7O_{20}F_4$$

ROBERT A. HATCH.

REFERENCES CITED

The following references are of record in the file of this patent:

FOREIGN PATENTS

| Number | Country | Date |
|--------|---------|------|
| 367,537 | Germany | 1923 |